(12) United States Patent
Hwang

(10) Patent No.: US 6,337,594 B1
(45) Date of Patent: Jan. 8, 2002

(54) CHARGE PUMP CIRCUIT

(75) Inventor: Tae Sun Hwang, Chungcheongbuk-do (KR)

(73) Assignee: Hynix Semiconductor, Inc., Kyoungki-Do (KR)

( * ) Notice: Subject to any disclaimer, the term of this patent is extended or adjusted under 35 U.S.C. 154(b) by 0 days.

(21) Appl. No.: 09/184,883

(22) Filed: Nov. 3, 1998

(30) Foreign Application Priority Data

Jun. 17, 1998 (KR) ............................................. 98-22752

(51) Int. Cl.[7] ................................................. G05F 1/10
(52) U.S. Cl. ........................ 327/536; 327/537; 327/543
(58) Field of Search ................................. 327/536, 589, 327/537, 390, 538, 343, 535; 326/88

(56) References Cited

U.S. PATENT DOCUMENTS

| | | | |
|---|---|---|---|
| 5,029,063 A | * | 7/1991 | Lingstaedt et al. ............ 363/60 |
| 5,291,446 A | | 3/1994 | Van Buskirk et al. .. 365/189.09 |
| 5,422,586 A | * | 6/1995 | Tedrow et al. ............... 327/306 |
| 5,489,870 A | * | 2/1996 | Arakawa ...................... 327/536 |
| 5,521,547 A | * | 5/1996 | Tsukada ....................... 327/537 |
| 5,524,266 A | | 6/1996 | Tedrow et al. ............... 395/800 |
| 5,589,793 A | * | 12/1996 | Kassapian .................... 327/536 |
| 5,818,289 A | * | 11/1999 | Chevallier et al. ........... 327/536 |
| 5,982,223 A | * | 11/1999 | Park et al. .................... 327/536 |

* cited by examiner

Primary Examiner—Timothy P. Callahan
Assistant Examiner—Hai L. Nguyen

(57) ABSTRACT

The charge pump circuit, includes an amplifier, a condenser, and a modifying circuit. The amplifier has a plurality of first voltage transfer stages, and each first voltage transfer stage transfers a voltage from an input to an output thereof such that the output voltage equals the input voltage minus a voltage drop. The condenser increases the output voltage at the output of at least one of the voltage transfer stages, and the voltage modifying circuit modifies each increased output voltage to compensate for the voltage drop.

18 Claims, 4 Drawing Sheets

CHARGE PUMP CIRCUIT

BACKGROUND OF THE INVENTION

1. Field of the Invention

The present invention relates to a charge pump circuit, and more particularly, to a charge pump circuit which improves reliability and economic efficiency of a circuit.

2. Discussion of the Related Art

FIG. 1 is a circuit diagram illustrating a conventional charge pump circuit. As shown in FIG. 1, the conventional charge pump circuit includes an amplifier 11, a condenser 12, a first clock input 13 and a second clock input 14. The amplifier 11 includes first, second, third, fourth and fifth NMOS transistors 15, 16, 17, 18 and 19 connected in series. Gates and drains of the first, second, third, fourth and fifth NMOS transistors 15, 16, 17, 18 and 19 are connected with one another, and their substrates are connected to a ground voltage VSS.

The drain of the first NMOS transistor 15 is connected to a driving voltage $V_{DD}$, and the drain of the second NMOS transistor 16 is connected to a source of the first NMOS transistor 15. In the same manner as the second NMOS transistor 16, the drains of the third and fourth NMOS transistors 17 and 18 are respectively connected to sources of respective previous NMOS transistors.

The drain of the fifth NMOS transistor 19 is connected to the source of the fourth NMOS transistor 18, and the source of the fifth NMOS transistor 19 is connected to an output 24.

The condenser 12 includes first, second, third and fourth capacitors 20, 21, 22 and 23. Each capacitor is formed by an NMOS transistor with the gate thereof serving as one electrode and the source, drain and substrate connected together serving as the other electrode. The first, second, third and fourth capacitors 20, 21, 22 and 23 are connected with gates and drains of the second, third, fourth, and fifth NMOS transistors 16, 17, 18, and 19, respectively.

The first and third capacitors 20 and 22, connected to the drains of the second and fourth NMOS transistors 16 and 18, are connected with the first clock input 13. The second and fourth capacitors 21 and 23, connected to the drains of the third and fifth NMOS transistors 17 and 19, are connected with the second clock input 14.

The operation of the aforementioned conventional charge pump circuit will be described below.

In the charge pump circuit, a voltage drop $V_T$ occurs when the first—fifth NMOS transistors 15–19 transfer a voltage at their drains to their sources because the same voltage at each respective drain is applied to the respective gate.

The driving voltage $V_{DD}$ is applied to the gate and drain of the first NMOS transistor 15, so that the source of the first NMOS transistor 15 is charged to $V_{DD}-V_T$. In this state, if the first clock goes from 0V to $V_{DD}$, the source of the first NMOS transistor 15 increases by $V_{DD}$ because the charge across the first capacitor 20 must remain constant. Accordingly, the charge at the source of the first NMOS transistor 15 is pumped to $2V_{DD}-V_T$.

If $2V_{DD}-V_T$ is applied to the gate and drain of the second NMOS transistor 16, the source voltage of the second NMOS transistor 16 becomes $2V_{DD}-2V_T$. At this time, if the second clock 14 goes from 0V to $V_{DD}$, the source voltage of the second NMOS transistor 16 increases by $V_{DD}$ and becomes $3V_{DD}-2V_T$.

In the same manner as above, the operation at the third and fourth NMOS transistors 17 and 18 is performed.

Then, if $5V_{DD}-4V_T$ is applied to the gate and drain of the fifth NMOS transistor 19, the source voltage of the fifth NMOS transistor 19 becomes $5V_{DD}-5V_T$. Accordingly, an output voltage $V_{PP}$ of $5V_{DD}-5V_T$ appears at the output 24. The output voltage $V_{PP}$ can be expressed as follows:

$$V_{PP}=[V_{DD}+n(V_{CLK}-V_T)]-V_T \qquad (1)$$

assuming that both the first and second clocks transition by the same voltage $V_{CLK}$, and where n is the number of pumping stages (i.e., the number of capacitors in the condenser 12).

The conventional charge pump circuit has several problems.

First, because of the cummulative of the voltage drop $V_T$ occurring at each NMOS transistor in the amplifier 11, a voltage lower than desired is output. This reduces the reliability of the circuit. In addition, more stages are required to output the desired voltage, but the additional stages reduce current driving ability and economic efficiency, in terms of size, of the circuit.

SUMMARY OF THE INVENTION

Accordingly, the present invention is directed to a charge pump circuit that substantially obviates one or more of the problems due to limitations and disadvantages of the related art.

An object of the present invention is to provide a charge pump circuit which compensates for the voltage drop to improve reliability and economic efficiency of a circuit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

These and other objects are achieved by providing a charge pump circuit, comprising: an amplifier having a plurality of first voltage transfer stages, each first voltage transfer stage transferring a voltage from an input to an output thereof such that the output voltage equals the input voltage minus a voltage drop; a first condenser increasing the output voltage at the output of at least one of the voltage transfer stages; and voltage modifying means for modifying each increased output voltage to compensate for the voltage drop.

It is to be understood that both the foregoing general description and the following detailed description are exemplary and explanatory and are intended to provide further explanation of the invention as claimed.

BRIEF DESCRIPTION OF THE DRAWINGS

The present invention will become more fully understood from the detailed description given below and the accompanying drawings which are given by way of illustration only, wherein like reference numerals designate corresponding parts in the various drawings, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
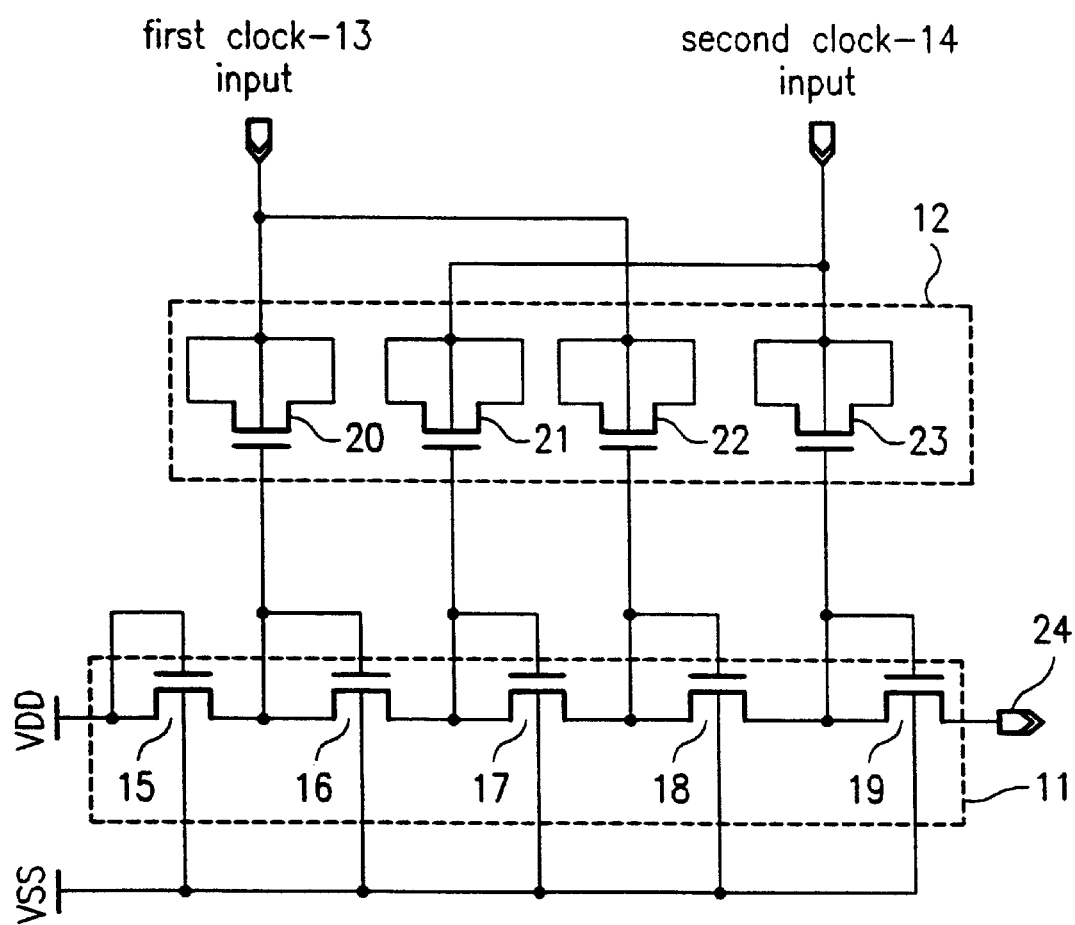
FIG. 1 is a circuit diagram illustrating a conventional charge pump circuit.
Figure 2:
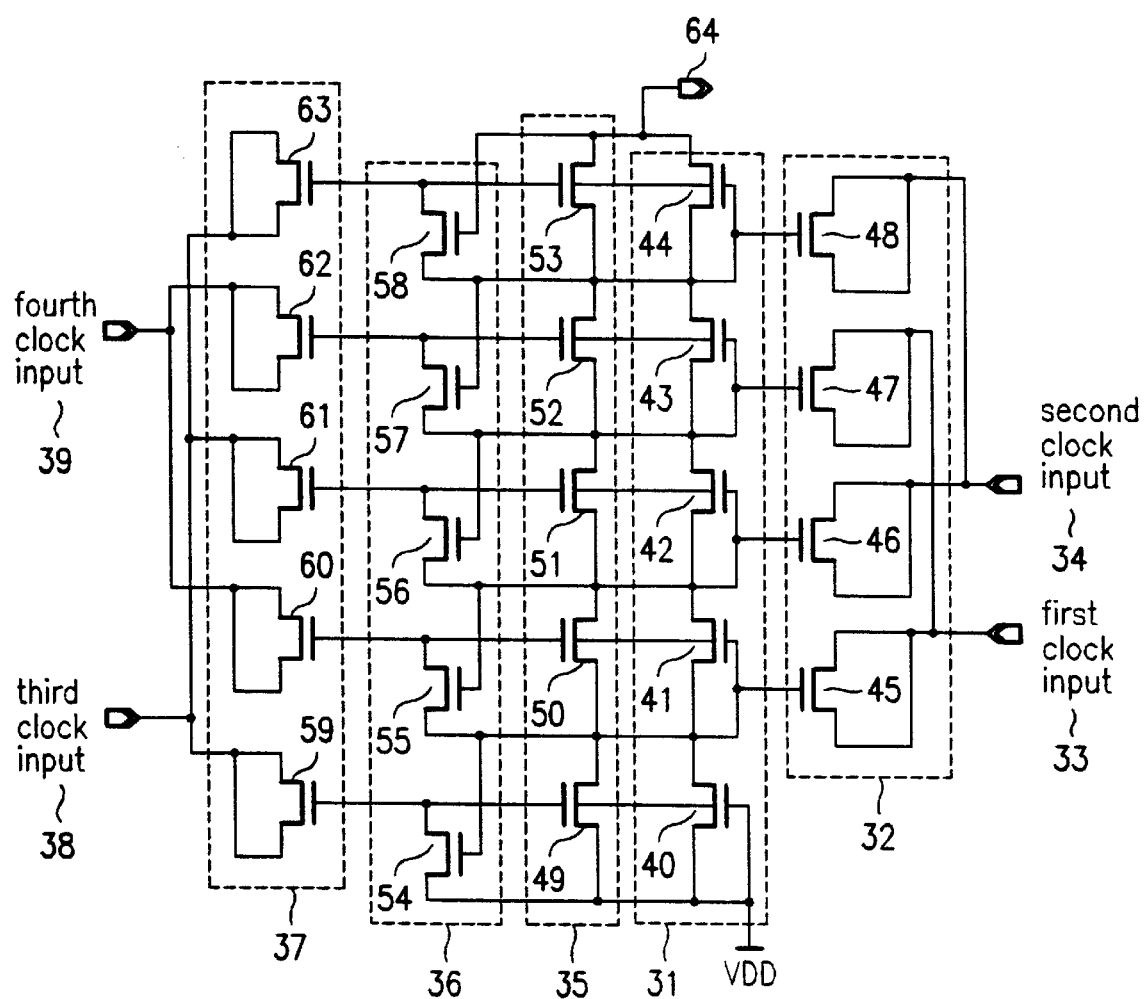
FIG. 2 is a circuit diagram illustrating a charge pump circuit according the embodiment of the present invention.

FIG. 2 illustrates an embodiment of the charge pump circuit according to the present invention. As shown, the circuit includes an amplifier 31 connected to a first condenser 32 and a moving portion 35. The circuit further includes a controller 36 connected to the moving portion 35 and a second condenser 37.

The amplifier 31 includes first, second, third, fourth, and fifth NMOS transistors 40, 41, 42, 43, and 44 connected in series. The respective drain and gate of each of the first—fifth NMOS transistors 40–44 are connected together. The drain of the first NMOS transistor 40 is also connected to a driving voltage $V_{DD}$, and the source of the fifth NMOS transistor is connected to an output 64.

The first condenser 32 includes first, second, third, and fourth capacitors 45, 46, 47 and 48. Each capacitor is formed by an NMOS transistor with the gate thereof serving as one electrode and the source and drain connected together serving as the other electrode. As shown in FIG. 2, the first capacitor 45 is connected between a first clock input 33 and the source of the first NMOS transistor 40, the second capacitor 46 is connected between a second clock input 34 and the source of the second NMOS transistor 41, the third capacitor 47 is connected between the first clock input 33 and the source of the third NMOS transistor 42, and the fourth capacitor 48 is connected between a second clock input 34 and the source of the fourth NMOS transistor 43.

The moving portion 35 includes sixth, seventh, eighth, ninth and tenth NMOS transistors 49, 50, 51, 52 and 53 connected in series. The drain of the sixth NMOS transistor 49 receives the driving voltage $V_{DD}$, and the source of the tenth NMOS transistor 53 is connected to the output 64. The substrate of the sixth—tenth NMOS transistors 49–53 are respectively connected to the substrate of the first—fifth NMOS transistors 40–44.

The controller 36 includes eleventh, twelfth, thirteenth, fourteenth and fifteenth NMOS transistors 54, 55, 56, 57, and 58. The drain of the eleventh NMOS transistor 54 receives the driving voltage $V_{DD}$, and the source is connected to the gate of the sixth transistor 49. The drain and source of the twelfth NMOS transistor 55 are connected to the gate of the eleventh NMOS transistor 54 and the source of the seventh NMOS transistor 50, respectively. The drain and gate of the thirteenth NMOS transistor 56 are connected to the gate of the twelfth NMOS transistor 55 and the gate of the eighth NMOS transistor 51, respectively. The drain and source of the fourteenth NMOS transistor 57 are connected to the gate of the thirteenth NMOS transistor 56 and the gate of the ninth NMOS transistor 52, respectively. The drain and source of the fifteenth NMOS transistor 58 are connected to the gate of the fourteenth NMOS transistor 57 and the gate of the tenth NMOS transistor 53, respectively. The gate of the fifteenth NMOS transistor 58 is connected to the output 64.

The second condenser 37 includes fifth, sixth, seventh, eighth and ninth capacitors 59, 60, 61, 62 and 63. Each capacitor is formed by an NMOS transistor with the gate thereof serving as one electrode and the source and drain connected together serving as the other electrode. As shown in FIG. 2, the fifth capacitor 59 is connected between a third clock input 38 and the source of the eleventh NMOS transistor 54, the sixth capacitor 60 is connected between a fourth clock input 39 and the source of the twelfth NMOS transistor 55, the seventh capacitor 61 is connected between the third clock input 38 and the source of the thirteenth NMOS transistor 56, the eight capacitor 62 is connected between a fourth clock input 39 and the source of the fourteenth NMOS transistor 57, and the ninth capacitor 63 is connected between the third clock input 38 and the source of the fifteenth NMOS transistor 58.

Figure 4:
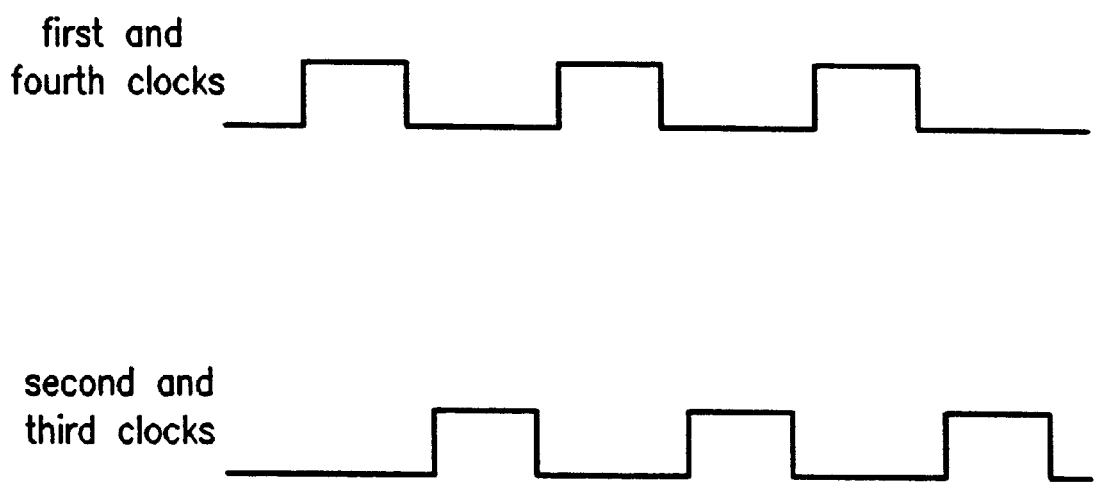
FIG. 4 is a pulse view illustrating each clock of a charge pump circuit according to the embodiment of the present invention.

The operation of the charge pump circuit will now be described. With the driving voltage $V_{DD}$ applied to both the drain and the gate of the first NMOS transistor 40, voltage at the source thereof becomes the driving voltage $V_{DD}$ less the voltage drop $V_T$. At this time, the first clock signal at the first clock input 33 transitions from 0V to $V_{DD}$ as shown in FIG. 4. As a result, the voltage at the source of the first NMOS transistor 40 increases by $V_{DD}$ to $2V_{DD}-V_T$.

Because this voltage of $2V_{DD}-V_T$, also applied to the gate of the eleventh NMOS transistor 54, is greater than the voltage $V_{DD}$ at the drain of the eleventh transistor 54, the voltage $V_{DD}$ at the drain is transferred to the source without the voltage drop $V_T$. Accordingly, the voltage at the source of the eleventh NMOS transistor 54 becomes $V_{DD}$.

Next, the first clock transitions from $V_{DD}$ to 0V, and the voltage at the source of the first NMOS transistor 40 returns to $V_{DD}-V_T$. Then, the third clock shown in FIG. 4 at the third clock input 38 transitions from 0V to $V_{DD}$. This causes the voltage at the source of the eleventh NMOS transistor 54 to increase to $2V_{DD}$. Because the voltage $2V_{DD}$ at the gate of the sixth NMOS transistor 49 is greater than the voltage $V_{DD}$ at the drain of the sixth NMOS transistor 49, the voltage $V_{DD}$ at the drain is transferred to the source without the voltage drop $V_T$. Consequently, the voltage $V_{DD}$ appears at the source of the sixth NMOS transistor 49. With the source of the first NMOS transistor 40 connected to the source of the sixth NMOS transistor 49, the voltage at the source of the first NMOS transistor 40 also becomes $V_{DD}$.

Then, the first clock transitions from 0V to $V_{DD}$ again, and the voltage at the source of the first NMOS transistor 40 becomes $2V_{DD}$. The next stage of the second NMOS transistor 41, the seventh NMOS transistor 50 and the twelfth NMOS transistor 55 operates in the same manner with respect to the second and fourth clocks received at the second and fourth clock inputs 34 and 39. The second and fourth clocks are illustrated in FIG. 4 as being the same as the third and first clocks, respectively. As a result, $3V_{DD}$ appears at the source of the second NMOS transistor 41.

The same operation is repeated for the next two stages such that $4V_{DD}$ appears at the source of the third NMOS transistor 42 and $5V_{DD}$ appears at the source of the fourth NMOS transistor 43. Because $5V_{DD}$ is applied to both the drain and the gate of the fifth NMOS transistor 44, the voltage at the source thereof becomes $5V_{DD}$ less the voltage drop $V_T$. Accordingly, the voltage $5V_{DD}-V_T$ at the source of the fifth NMOS transistor 44 is applied to the gate of the fifteenth transistor 58. But, because this gate voltage is less than the drain voltage of $5V_{DD}$, the drain voltage is not transferred to the source. Instead the voltage at the source of the fifteenth transistor 58 becomes $5V_{DD}-2V_T$.

Then, the third clock transitions from 0V to $V_{DD}$, and the ninth capacitor 63 causes the voltage at the source of the fifteenth transistor 58 to increase to $6V_{DD}-2V_T$. In a preferred embodiment, the charge pump circuit of FIG. 2 is designed so that $6V_{DD}-2V_T$ is greater than $5V_{DD}$. Therefore, in this preferred embodiment, the voltage $6V_{DD}-2V_T$ at the gate of the tenth transistor 53 is greater than the voltage $5V_{DD}$ at the drain of the tenth transistor 53, and the drain voltage is transferred to the source. Accordingly, the output voltage $V_{PP}$ becomes $5V_{DD}$, and the reduction in voltage caused by the voltage drop across the first—fifth transistors 40–44 has been completed compensated.

In an alternative embodiment, however, the gate voltage of $6V_{DD}-2V_T$ is less than the drain voltage of $5V_{DD}$. As a result, the voltage at the drain of the tenth transistor 53 is not transferred to the source, and the voltage at the source of the tenth transistor 53 becomes $6V_{DD}-3V_T$. Accordingly, the output voltage $V_{PP}$ becomes $6V_{DD}-3V_T$, and the reduction in voltage caused by the voltage drop across the first—fifth transistors 40–44 has been partially compensated.

The output voltage $V_{PP}$ can be expressed as follows when $6V_{DD}-2V_T$ is greater than $5V_{DD}$:

$$V_{PP}=V_{DD}+nV_{CLK} \quad (2)$$

assuming that the first, second, third and fourth clocks transition by the same voltage $V_{CLK}$, and where n is the number of pumping stages (i.e., the number of capacitors in the first condenser 32).

The output voltage $V_{PP}$ can be expressed as follows when $6V_{DD}-2V_T$ is less than $5V_{DD}$:

$$V_{PP}=V_{DD}+(n+1)V_{CLK}-3V_T \quad (3)$$

assuming that the first, second, third and fourth clocks transition by the same voltage $V_{CLK}$, and where n is the number of pumping stages (i.e., the number of capacitors in the first condenser 32).

Figure 3:
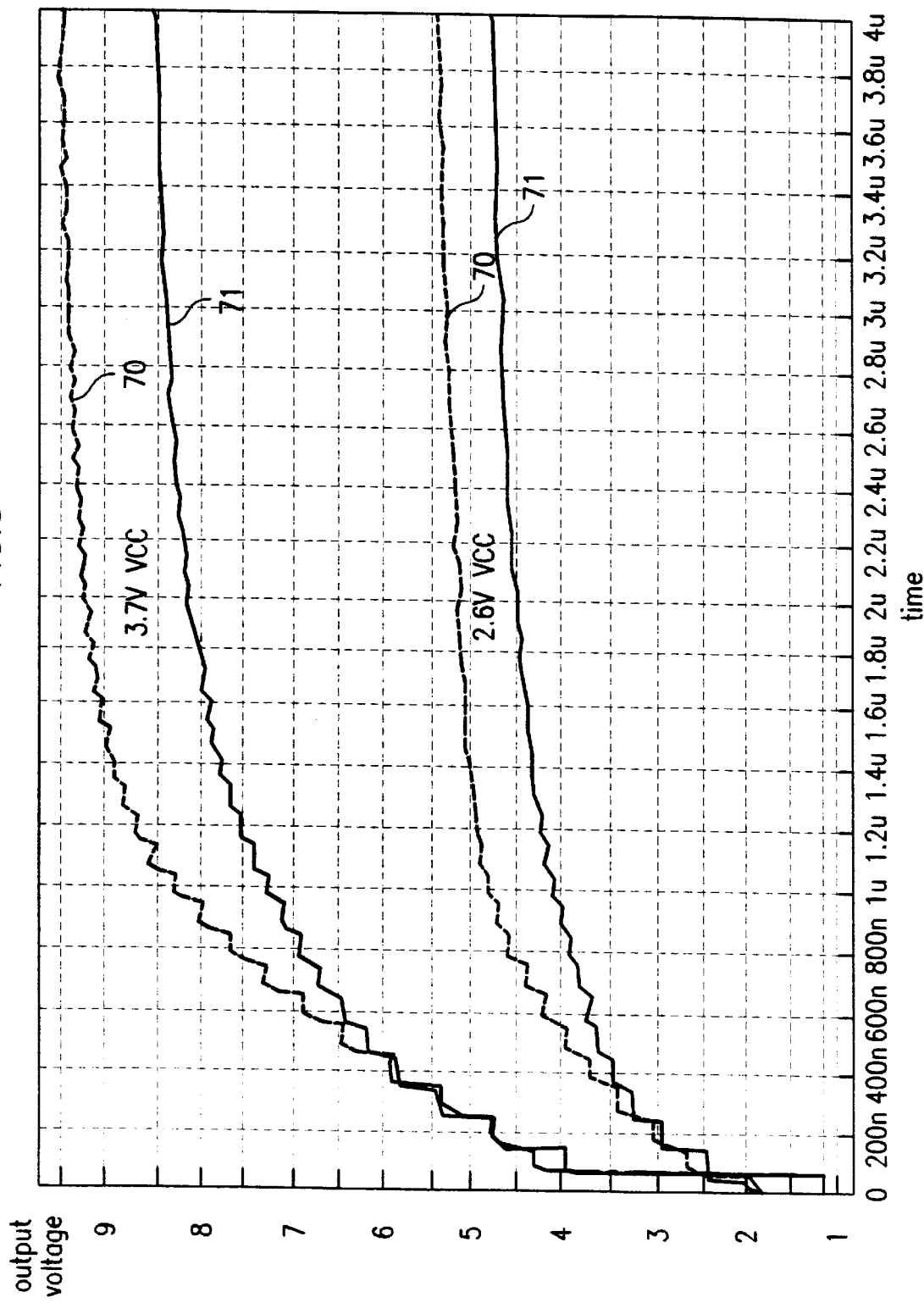
FIG. 3 is a comparative view illustrating an output voltage of a conventional charge pump circuit and an output voltage of a charge pump circuit according to the present invention.

As shown in FIG. 3 and equation (2), a voltage 70 output by the charge pumping circuit according to the preferred embodiment of the present invention does not suffer from a decease in voltage corresponding to the voltage drop $V_T$ unlike a voltage 71 output by the conventional charge pump circuit.

As aforementioned, the charge pump circuit according to the present invention has the following advantages.

Since the charge pump circuit of the present invention includes a controller and moving portion for removing the voltage drop $V_T$ at each stage of the amplifier, it is possible to obtain a desired voltage in low voltage (low VCC) applications. This improves reliability of the circuit. In addition, since the desired voltage is output while maintaining the number of the stages, it is possible to improve the current driving ability and economic efficiency, in the of size, of the circuit.

It will be apparent to those skilled in the art that various modifications and variations can be made in the charge pump circuit according to the present invention without departing from the spirit or scope of the invention. Thus, it is intended that the present invention covers the modifications and variations of the invention provided they come within the scope of the appended claims and their equivalents.

What is claimed is:

1. A charge pump circuit, comprising:
    an amplifier having a plurality of first voltage transfer stages, each first voltage transfer stage transferring a voltage from an input to an output thereof such that the output voltage equals the input voltage minus a voltage drop;
    a first condenser increasing the output voltage at the output of at least one of the first voltage transfer stages; and
    a voltage modifying circuit modifying each increased output voltage to compensate for the voltage drop,
    wherein the voltage modifying circuit modifies the increased output voltage in response to the increase in the output voltage.

2. The charge pump circuit of claim 1, wherein the first condenser increases the output voltage in response to at least a first clock.

3. The charge pump circuit of claim 1, wherein the first condenser increases each modified output voltage.

4. The charge pump circuit of claim 1, wherein the first condenser increases the output voltage at the output of each transfer stage except a final transfer stage.

5. The charge pump circuit of claim 4, wherein the first condenser increases each modified output voltage.

6. The charge pump circuit of claim 4, wherein the first condenser increases the output voltage at the output of each transfer stage except the final transfer stage in response to at least first and second clocks.

7. The charge pump circuit of claim 1, wherein the voltage modifying circuit modifies the increased output voltage to a voltage equal to the output voltage prior to the increase plus the voltage drop.

8. The charge pump circuit of claim 1, wherein the voltage modifying circuit modifies the increased output voltage in response to at least a first clock signal.

9. The charge pump circuit of claim 1, wherein the voltage modifying circuit detects an increase in an output voltage, and modifies the detected increased output voltage.

10. The charge pump circuit of claim 1, wherein the voltage modifying circuit comprises:
    a controller having a plurality of second voltage transfer stages, each second voltage transfer stage corresponding to one of the first voltage transfer stages and transferring the input voltage of the corresponding first voltage transfer stage from a first terminal to a second terminal;
    a second condenser increasing the voltage at the second terminal of at least the second voltage transfer stage corresponding to the first voltage transfer stage that the first condenser increases the output voltage of; and
    a moving portion including a plurality of voltage moving stages, each voltage moving stage corresponding to one of the first voltage transfer stages and moving the input voltage of the corresponding first voltage transfer stage to the output of the corresponding first voltage transfer stage when the second terminal voltage of the second voltage transfer stage corresponding to the first voltage transfer stage is increased by the second condenser.

11. The charge pump circuit of claim 10, wherein the first condenser includes a plurality of first capacitors.

12. The charge pump circuit of claim 10, wherein
    the first condenser includes a plurality of first capacitors; and
    the second condenser includes a plurality of second capacitors.

13. A charge pump circuit, comprising:
    an amplifier having a plurality of first voltage transfer stages, each first voltage transfer stage transferring a voltage from an input to an output thereof such that the output voltage equals the input voltage minus a voltage drop;
    a first condenser increasing the output voltage at the output of at least one of the first voltage transfer stages; and
    a voltage modifying circuit modifying each increased output voltage to compensate for the voltage drop, wherein the voltage modifying circuit comprises:
- a detecting circuit detecting an increase in the output voltage of at least one of the first voltage transfer stages;
- an enable circuit generating an enable signal when the detecting circuit detects an increase in the output voltage; and
- an outputting circuit modifying the increased output voltage in response to the enable signal.

14. The charge pump circuit of claim 13, wherein
- the first transfer stages include a plurality of first transistors connected in series;
- the second transfer stages include a plurality of second transistors connected in series; and
- the moving stages include a plurality of third transistors connected in series.

15. The charge pump circuit of claim 13, wherein the first transfer stages include a plurality of first transistors connected in series.

16. A method of operating a charge pump circuit having a plurality of voltage transfer stages comprising:
- transferring, by each voltage transfer stage, a voltage from an input to an output thereof such that the output voltage equals the input voltage minus a voltage drop;
- increasing the output voltage of at least one of the voltage transfer stages; and
- modifying the increased output voltage to compensate for the voltage drop by using a modifying circuit to modify the increased output voltaged in response to the increase in the output voltage.

17. The method of claim 16, wherein the increasing and modifying steps are performed for at least two voltage transfer stages.

18. The method of claim 16, wherein the modifying step comprises:
- applying the input voltage of said voltage transfer stage, to an input of a voltage controller and to an input of a voltage mover;
- transferring the input voltage of said voltage controller to an output thereof without any voltage drop, in response to the increased output voltage of said voltage transfer stage;
- increasing the output of said voltage controller;
- transferring the input voltage of said voltage mover to an output thereof without any voltage drop, in response to the increased output voltage of said voltage controller;
- applying the output voltage of said voltage mover, to the output of said voltage transfer stage, such that the input voltage of said voltage transfer stage appears at the output of said voltage transfer stage.

* * * * *